United States Patent Office 3,343,270
Patented Sept. 26, 1967

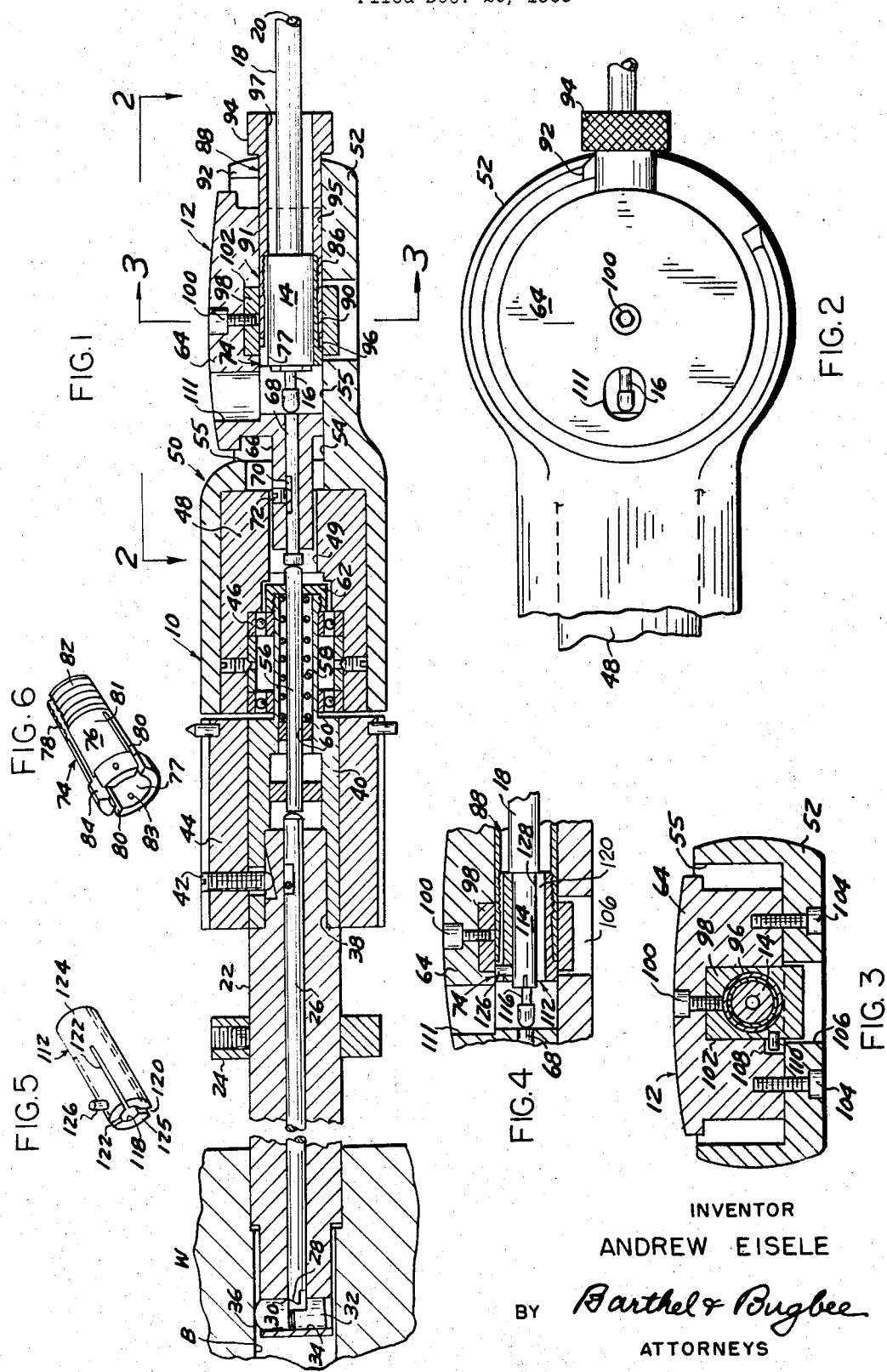
Sept. 26, 1967 A. EISELE 3,343,270
DIAL INDICATOR BORE GAUGE CONVERSION DEVICE
Filed Dec. 20, 1965
INVENTOR
ANDREW EISELE
BY Barthel & Bugbee
ATTORNEYS

3,343,270
DIAL INDICATOR BORE GAUGE
CONVERSION DEVICE
Andrew Eisele, 20460 Brookwood,
Dearborn Heights, Mich. 48127
Filed Dec. 20, 1965, Ser. No. 515,017
9 Claims. (Cl. 33—178)

This invention relates to bore gauges. The object of the invention is to provide an adaptation device which is substituted for the conventional dial indicator in such gauges and accommodates the operating unit of an air-actuated measurement indicating instrument known commercially by the trade name of "Plunjet."

FIGURE 1 is a central longitudinal vertical section through a bore gauge fitted with the adaptation device and large-diameter "Plunjet" operating unit as applied to the measurements of a workpiece bore;

FIGURE 2 is a top plan view of the rearward portion of the assembly shown in FIGURE 1, looking in the direction of the arrows 2—2 therein;

FIGURE 3 is a cross-section taken along the line 3—3 in FIGURE 1;

FIGURE 4 is a fragmentary longitudinal section through the rearward portion of FIGURE 1, but showing a contractible adapter sleeve for accommodating a smaller diameter air-actuating operating cylinder;

FIGURE 5 is a perspective view of the contractible adapter sleeve; and

FIGURE 6 is a perspective view of a "Plunjet" holder chuck as used in the invention.

Hitherto, bore gauges have been provided for measuring the diameters of bores by means of transversely movable feeler pins, the motion of which is transmitted through the body of the bore gauge to a conventional dial indicator mounted on the rearward end of the gauge body. Hitherto, also, an air-operated measurement indicating system known commercially as the "Plunjet" has been provided employing an operating piston which when moved transmits its motion through a column of air in a tube to a graduated indicating device upon which the motions of the plunger are indicated. The present invention enables the "Plunjet" piston and cylinder to be mounted in a bore gauge in place of the dial indicator so that the measurements of the bore gauge as effected by the motion of its feeler pin are transmitted to the "Plunjet" piston and thence through the air column to the "Plunjet" indicator.

Referring to the drawing in detail, FIGURE 1 shows a bore gauge, generally designated 10, equipped with the adaptation device 12 of the present invention for accommodating the air-actuating operating cylinder 14 containing the operating piston 16 of the air-operated measurement indicating system having an indicating instrument (not shown) to which the cylinder 14 is connected by a flexible pipe or tube 18. The motion of the piston 16 is transmitted to the measurement indicating device (not shown) by the compression or expansion of the air within the passageway 20 of the tube 18. The cylinder 14, its piston 16, tube 18 and measurement indicating device (not shown) are well-known to those skilled in the measurement art and their details form no part of the present invention.

The bore gauge 10 consists of a hollow stem 22 carrying an adjustable annular depth stop 24 and contains a forward motion-transmitting rod 26 which has a beveled forward end 28 engaged by a notch edge 30 in a measuring pin or feeler 32 which is transversely movable in a transverse bore 34 and which has a rounded end 36 engageable with the bore B of the workpiece W to be measured. The stem 22 at its rearward end is of reduced diameter fitting into a counterbore 38 in a hollow cylindrical shaft 40 and clamped by a set screw 42 to a rotary handle 44 mounted on the shaft 40 so as to rotate unitarily therewith. The hollow shaft 40 has a reduced diameter rearward portion which is rotatably mounted upon spaced anti-friction ball bearings 46 within a stationary hollow cylindrical body 48 containing a stepped bore 49 and mounted within a correspondingly counterbored hollow stationary handle 50.

The hollow stationary handle 50 is provided with a cup-shaped rearward end portion 52 which ordinarily contains the conventional dial indicator (not shown) which the present invention replaces and which has a hollow stem adapted to project forwardly through a passageway 54 from a cup-shaped cavity 55 in the rearward handle portion 52, so that its operating plunger (not shown) engaged an intermediate motion-transmitting rod 56. The intermediate motion-transmitting rod 56 is reciprocably mounted within the hollow shaft 40 with its forward end engaging the rearward end of the forward motion-transmitting rod 26 and is resiliently urged forwardly by a helical compression spring 58 acting against an abutment collar 60 fixedly mounted on the rod 56. A cup-shaped internally-threaded collar 62 threaded upon the externally-threaded rearward end of the hollow shaft 40 serves as a rearward abutment for the spring 58 and also as a retainer for the spaced anti-friction bearings 46.

The adaptation device 12 includes a flanged approximately cylindrical body 64 provided with a forward tubular projection 66 adapted to extend through the opening 54 into the hollow cylindrical body 48 and containing a reciprocable rearward motion-transmitting rod 68, the headed forward end of which engages the rearward end of the intermediate motion-transmitting rod 56 and the rearward end the forward end of the piston 16 (FIGURE 1). The tubular projection 66 is made of sufficiently small diameter and the lower portion of the body 64 also sufficiently small in diameter to be inserted in the respective passageway 54 and the cup-shaped cavity or socket 55 by tilting the same, as explained below in connection with the operation of the invention. The rearward transmitting rod 68 is cut away and flattened at 70 for engagement by a rotation-preventing set screw 72 threaded transversely through the tubular projection 66.

The larger diameter operating cylinder 14 of the air-operated measurement indicator (not shown) is held tightly within and gripped by a flanged split tubular chuck 74 (FIGURE 4). The latter consists of a flanged tubular body 76 containing an elongated bore 77 and having a longitudinal or axial slot 78 extending through its side wall between its opposite ends and a circumferentially-spaced pair of slots 80 also extending through the tapered forward portion 81 of its length and terminating at the beginning of an externally-threaded rearward portion 82. The slot 78 terminates at its forward end in an enlarged notch 84. The slots 78 and 80 subdivide the flanged forward portion 81 of the chuck body 76 into three chuck jaws 83.

Threaded onto the rearward threaded portion 82 of the chuck 74 is the intermediately-internally-threaded portion 86 of an elongated tubular chuck actuator 88 having a forward internally-tapered portion 90 correspondingly tapered to fit the externally-tapered portion 81 of the chuck 74 and with the chuck 74 constituting a chuck assembly 91. The rearward portion of the tubular chuck actuator 88 passes through a U-shaped notch 92 in the cup-shaped body portion 52 and terminates in a knurled head 94 by which it may be rotated within an elongated bore 95 in the adaptation device body 64 to constrict or expand the chuck 74, as desired. The air tube 18 from the cylinder 14 passes rearwardly through the bore 97 in the chuck actuator 88. The inner or forward end of the chuck actuator 88 and the flanged forward end of the chuck 74 are held snugly within a bore 96 within a rectangular block 98 (FIGURES 1 and 3) which is threaded transversely on top to receive a threaded clamping screw 100 which, when tightened, firmly seats the block 98 in a correspondingly-shaped rectangular recess 102 within the body 64.

The bottom of the adaptation device body 64 and the bottom wall of the stationary handle rearward end portion 52 are bored and threaded in alignment to receive screws 104 (FIGURE 3) by which the adaptation device 12 is firmly held and retained within the cup-shaped cavity 55 in the rearward handle portion 52. The bottom wall of the rearward handle portion 52 immediately below the block 98 is provided with an access opening 106 communicating with the cavity 55. The adaptation device body portion 64 adjacent the recess 102 (FIGURE 3) is provided with an offset notch 108 receiving a pin 110 seated in one side of the block 98. The body portion 64 is also provided with an access opening 111 of elongated cross-section extending downwardly into alignment with the bore 95 so that the forward end of the piston 16 is visible to the operator for adjustment purposes.

The modification shown in FIGURES 5 and 6 provides an elongated split tubular adapted 112 which accommodates smaller diameter air-actuating operating cylinders 114 and their pistons 116 instead of the larger-diameter cylinders 14 and pistons 16 of FIGURE 1. In order to accommodate the smaller diameter cylinders 114 within the tubular chuck 74, as shown in FIGURE 6, the elongated split-tubular adapter 112 is provided with a longitudinal bore 118, and fills the annular space therebetween (FIGURE 5). The adapter 112 is of cylindrical shape and, like the chuck 74, is provided in its side wall with an end-to-end longitudinal slot 120 and circumferentially-spaced shorter longitudinal slots 122 terminating short of the rearward end portion 124 and forming gripping jaws 125. The forward portion of the adapter 117 is drilled radially to receive a rotation-preventing pin 126 which fits into the notch 84 in the forward end of the chuck 74. The slots 120 and 122 enable the bore 118 within the adapter 112 to be constricted by the corresponding constriction of the slotted body portion 81 of the chuck 74 by the rotation of the tubular chuck actuator 88, as explained below.

In the operation of the invention employing the large diameter air-actuating operating cylinder 14 of FIGURES 1 to 4 inclusive, let it be assumed that the bore gauge 10 has previously contained a conventional dial indicator in its cavity or socket 55 and that this has been removed, leaving the socket 55, the passageway 54 and the rearward or smallest diameter portion of the stepped bore 49 empty. Let it also be assumed that the chuck 74 and its actuator 88 have been removed from the device 12. To mount the large diameter air cylinder 14 in the adaptation device body 64, the operator loosens the screw 100 to permit the bore 96 of the block 98 to move downward into alignment with the bore 95.

The operator now holds the chuck 74 in one hand while he unscrews the tubular chuck actuator 88 therefrom, thus withdrawing the internally-tapered portion 90 thereof from engagement with the externally-tapered portion 81. The resilience of the chuck 74, which is ordinarily made of resilient steel, then causes the jaws 83 to spring outward, enlarging its bore 77. The operator then pushes the air cylinder 14, with its air hose 18 attached, through the bore 97 of the chuck actuator 88 into the bore 77 of the chuck 74. He then holds the chuck 74 in one hand while he rotates the knurled head 94 to screw the chuck actuator 88 forwardly onto the chuck 74. This action causes the internally-tapered portion 96 of the chuck actuator 88 to move forwardly over the externally-tapered portion 81 of the chuck 74, thereby moving the chuck jaws 83 inward and constricting its bore 77 into clamping engagement with the cylinder 14.

The operator now tightens the screw 100 slightly by means of a conventional Allen wrench, in order to draw the block 98 slightly upward in its recess 102. This action temporarily clamps the chuck assembly 91 within the adaptation device body 64 preparatory to adjusting the forward end of the piston 16 to its proper position or correctly registering the measurement upon the scale of the air-operated measurement indicator (not shown).

To insert the thus-assembled adaptation device 12 into the bore gauge 10, the operator tilts the body 64 thereof and its projection 66 downwardly while thrusting the forward end of the projection 66 through the socket 55 and passageway 54 into the rearward end of the stepped bore 49, which has a sufficient clearance to permit entry of the projection 66. As the projection 66 is pushed into the bore 49, the operator lowers the body 64 of the adaptation device 12 into the socket 55, at the same time lowering the chuck actuator 88 into the U-shaped notch 92. He then moves the body 64 around while inserting each screw 104 (FIGURE 3) through the bottom wall of the rearward handle portion 52 until the screws 104 enter their screw holes in the body 64, whereupon he tightens the screws 104 to seat the adaptation device 12 firmly in the socket 55 against the bottom wall thereof. This action aligns the forward end of the rearward motion-transmitting rod 68 with the rearward end of the intermediate motion-transmitting rod 56 (FIGURE 1).

To adjust the position of the cylinder 14 so that the motion of its piston 16 effects proper measurement indications, of the air-operated measuring system, the operator inserts the forward end of the stem 22 of the bore gauge 10 in the bore of a standard ring gauge of the desired size. He then pushes the U-notched end of a calibration shim or feeler (not shown) of known thickness through the access opening 111 against the annular shoulder behind the enlarged forward end of the piston 16 and by means of it he pushes forward the rearward end of the rearward rod 68. This action pushes forward the motion-transmitting rods 56 and 26 and moves the end 36 of the pin 32 into contact with the ring gauge bore. He then loosens the screw 100, grasps the knurled head 94, and pushes the chuck assembly 91 forward until the head of the cylinder 14 engages the rearward side of the calibration feeler. The operator now tightens the screw 100, pulling the block 98 and its bore 96 upward out of alignment with the bore 95 in the body 64, thereby clamping the chuck assembly 91 firmly in its adjusted and now calibrated position. He then removes the calibration shim or feeler through the access opening 111 and the converted bore gauge 10 is ready for use.

To make a measurement of a bore B and workpiece W, the operator inserts the measuring pin or feeler 32 to engage the bore B and move transversely. Its transverse motion is converted into longitudinal or axial motion of the forward motion-transmitting rod 26 by the action of the edge 30 sliding along the inclined end surface 28 thereof. This motion of the forward motion-transmitting rod 26 is transmitted through the intermediate and rearward motion-transmitting rods 56 and 68 to the piston 16, the head of which (not shown) within the cylinder 14 pushes the air therein rearwardly back through the passageway 20 in the air tube or hose 18. This motion of the air is conveyed to the conventional air-operated measurement-indicating device (not shown) which by means of a rising and falling indicator, at once shows the measurement upon its graduated scale.

To employ a smaller diameter air-actuating operating cylinder 114 (FIGURES 5 and 6), the operator inserts the split tubular adapter 112 into the bore 77 of the split chuck 74 while causing the rotation-preventing pin 126 to enter the notch 84 thereof (FIGURES 4 and 5). He now inserts the externally-threaded portion 82 of the chuck 74 into the internally-threaded portion 86 of the chuck actuator 88 and inserts the small diameter cylinder 114 through the bore 118 of the tubular adapter 112 (FIGURE 6). He then tightens the chuck 74 by rotating the chuck actuator 88, whereupon the jaws 83 thereof move radially inward, transmitting this motion to the jaws 125 of the tubular adapter 112 which, like the chuck 74, is of resilient material, such as resilient steel. This action firmly clamps the small diameter cylinder 114 within the adapter 112, which itself is at the same time clamped within the chuck 74.

By means of a U-notched calibration feeler (not shown), he again follows the installation and calibration procedure described above in connection with the large diameter cylinder 14, to insert and adjust the piston 116 and cylinder 114 of the adaptation device 12 to their proper positions. Measurement is then made in the manner described above in connection with the adaptation device 12 containing the large diameter cylinder 14.

It will be evident that the present invention enables the instant reconversion of the bore gauge 10 to dial indicator measurement in the event of failure of the air-actuated measurement system. The adaptation device 12 in that event is removed by reversing the installation procedure steps described above after removing the screws 104 (FIGURE 3) from the body 64. The adaptation device 12 is then easily lifted out of the socket 55 by raising the rearward end thereof by means of the knurled head 94 out of the notch 92, after which the body 64 and its forward projection 66 may be withdrawn in an upwardly and rearwardly inclined direction. The conventional dial indicator (not shown) is then reinserted in the socket 55 with its stem occupying the position previously occupied by the projection 66 of the body 64, after which the screws 104 are reinserted in correspondingly-located threaded holes in the bottom wall of the dial indicator casing. The air-operated measurement system, however, possesses the advantage over the dial indicator of having its graduations much farther apart for the same measurement, with a consequent increase in ease and accuracy of reading.

What I claim is:

1. An adaptation device for replacement of the conventional dial indicator of a dial indicator bore gauge by the operating cylinder of a conventional air-actuated measurement indicating system, said bore gauge having a dial indicator holder, bore contacting elements and a mechanism for transmitting motion of said elements to the dial indicator mounted in said holder, said adaptation device comprising an adaptation body configured to fit the bore gauge dial indicator holder and having a recess adapted to be aligned with the bore gauge motion-transmitting mechanism, an operating cylinder holder disposed in said recess for adjustment motion back and forth therein, means for securing said cylinder holder in its adjusted position within said recess, means for clamping the cylinder within said cylinder holder, and means for transmitting the motion from the bore gauge mechanism to said operating cylinder when in said holder.

2. An adaptation device, according to claim 1, wherein said last mentioned means includes a hollow extension projecting forwardly from said body toward the dial indicator mechanism and wherein a motion-transmitting element is movably mounted in said extension.

3. An adaptation device, according to claim 2, wherein said adaptation body includes a substantially cylindrical main portion and wherein said hollow extension projects substantially radially from said main portion.

4. An adaptation device, according to claim 1, wherein said operating cylinder holder includes a contractible chuck assembly having a constrictible bore therein configured to receive the operating cylinder.

5. An adaptation device, according to claim 4, wherein said chuck assembly includes a split tubular cylinder-receiving member with a tapered external surface thereon, and also includes a tubular operating member with a tapered internal surface operatively engaging said tapered external surface.

6. An adaptation device, according to claim 5, wherein said members have interengaging threaded portions thereon responsive to relative rotation therebetween for moving said tapered surfaces axially relatively to one another.

7. An adaptation device, according to claim 4, wherein a split tubular smaller cylinder adapter is disposed within said cylinder-receiving member and has gripping portions thereon contractible in response to the contraction of said cylinder-receiving member.

8. An adaptation device, according to claim 1, wherein said clamping means includes a clamping element adapted to engage the cylinder and movable transversely to said holder into clamping relationship with the cylinder.

9. An adaptation device, according to claim 1, wherein said body has an adjustment access opening extending from the exterior thereof to said recess.

References Cited

UNITED STATES PATENTS

| | | | |
|---|---|---|---|
| 2,574,342 | 11/1951 | Mennesson | 33—178 |
| 2,721,392 | 10/1955 | Barrett | 33—178 |
| 2,998,656 | 9/1961 | St. Amour | 33—178 |
| 3,296,707 | 1/1967 | Eisele | 33—178 |

SAMUEL S. MATTHEWS, *Primary Examiner.*